(12) United States Patent
Gill et al.

(10) Patent No.: US 11,427,324 B2
(45) Date of Patent: Aug. 30, 2022

(54) LAVATORY, FIRST CLASS, AND BUSINESS CLASS SEAT INTEGRATION

(71) Applicant: Safran Seats GB Limited, Cwmbran (GB)

(72) Inventors: Alison Gill, Toulouse (FR); Sebastien Sivignon, Brax (FR); Claude Martin, Lury sur Arnon (FR); Jerome Verbeque, Colomiers (FR)

(73) Assignee: Safran Seats GB Limited, Cwmbran (GB)

( * ) Notice: Subject to any disclaimer, the term of this patent is extended or adjusted under 35 U.S.C. 154(b) by 657 days.

(21) Appl. No.: 15/534,603

(22) PCT Filed: Dec. 21, 2015

(86) PCT No.: PCT/IB2015/059859
§ 371 (c)(1),
(2) Date: Jun. 9, 2017

(87) PCT Pub. No.: WO2016/098088
PCT Pub. Date: Jun. 23, 2016

(65) Prior Publication Data
US 2018/0009531 A1    Jan. 11, 2018

Related U.S. Application Data

(60) Provisional application No. 62/094,804, filed on Dec. 19, 2014.

(51) Int. Cl.
*B64D 11/06* (2006.01)
*B64D 11/02* (2006.01)

(52) U.S. Cl.
CPC .............. *B64D 11/06* (2013.01); *B64D 11/02* (2013.01)

(58) Field of Classification Search
CPC ..... B64D 11/02; B64D 11/06; B64D 11/0606; B64D 11/0639; B64D 11/0641; B64D 11/0643
See application file for complete search history.

(56) References Cited

U.S. PATENT DOCUMENTS 9,022,320 B2 *  5/2015  Wallace .............. B64D 11/0646
                                                244/118.6
9,038,946 B2 *  5/2015  Hawkins ................ B64D 11/06
                                                244/118.6

(Continued)

FOREIGN PATENT DOCUMENTS

EP      3572327 A1 * 11/2019  ......... B64D 11/0604
WO    2014014780      1/2014

OTHER PUBLICATIONS

International Patent Application No. PCT/IB2015/059859, Invitation to Pay Additional Search Fees and Partial Search Report, dated Mar. 23, 2016.

(Continued)

*Primary Examiner* — Philip J Bonzell
(74) *Attorney, Agent, or Firm* — Kilpatrick Townsend & Stockton LLP

(57) ABSTRACT

Described are aircraft cabin arrangements (12) with at least one lavatory unit (14) with a first side wall (1402) and at least one seat unit (16) positioned adjacent the first side wall. A separate wall is not positioned between the first side wall and the at least one seat unit. The first side wall includes a recessed portion, and the at least one seat unit includes a foot support surface (1606) incorporated into the recessed portion of the first side wall.

18 Claims, 6 Drawing Sheets

(56) References Cited

U.S. PATENT DOCUMENTS

| | | | |
|---|---|---|---|
| 9,260,189 B2* | 2/2016 | Savian | B64D 11/02 |
| 9,527,591 B2* | 12/2016 | Savian | B64D 11/02 |
| 9,630,719 B2* | 4/2017 | Hawkins | B64F 5/00 |
| 9,896,212 B2* | 2/2018 | Savian | B64D 11/02 |
| 9,981,747 B2* | 5/2018 | Savian | B64D 11/02 |
| 10,023,314 B2* | 7/2018 | Savian | B64D 11/02 |
| 10,093,421 B2* | 10/2018 | Savian | B64D 11/02 |
| 10,301,025 B2* | 5/2019 | Savian | B64D 11/02 |
| 10,358,219 B2* | 7/2019 | Savian | A47K 4/00 |
| 10,435,158 B2* | 10/2019 | Goode | B64D 11/0624 |
| 2005/0211837 A1 | 9/2005 | Saint-Jaimes et al. | |
| 2012/0228902 A1* | 9/2012 | Thompson | B64D 11/02 297/147 |
| 2012/0325964 A1* | 12/2012 | Hawkins | B64D 11/064 244/118.6 |
| 2013/0206906 A1 | 8/2013 | Burrows et al. | |
| 2013/0241247 A1* | 9/2013 | Wallace | B64D 11/0604 297/118 |
| 2014/0196206 A1* | 7/2014 | Savian | B64D 11/02 4/664 |
| 2015/0251760 A1* | 9/2015 | Hawkins | B64C 1/10 244/118.5 |
| 2015/0307193 A1* | 10/2015 | Savian | B64D 11/02 244/118.5 |
| 2016/0009395 A1* | 1/2016 | Savian | B64D 11/02 244/118.5 |
| 2016/0122021 A1* | 5/2016 | Savian | B64D 11/02 244/118.5 |
| 2016/0332734 A1* | 11/2016 | Goode | B64D 11/0638 |
| 2017/0001728 A1* | 1/2017 | Savian | B64D 11/02 |
| 2017/0001729 A1* | 1/2017 | Savian | B64D 11/02 |
| 2017/0008630 A1* | 1/2017 | Savian | B64D 11/02 |
| 2017/0101184 A1* | 4/2017 | Savian | B64D 11/02 |
| 2017/0203844 A1* | 7/2017 | Hawkins | B64D 11/06 |
| 2018/0148175 A1* | 5/2018 | Savian | B64D 11/02 |
| 2018/0273182 A1* | 9/2018 | Savian | B64D 11/02 |

OTHER PUBLICATIONS

International Patent Application No. PCT/IB2015/059859, Search Report and Written Opinion, dated Jun. 1, 2016.

Europe Patent Application No. 15823806.3, Office Action (Communication pursuant to Article 94(3) EPC), dated Sep. 26, 2018.

John Walton: "On our way to the football world cup with the Boeing 747-8", ENP Newswire, Jul. 12, 2012 (Jul. 12, 2012), pp. 1-38, XP055507751, URL:file:///C:\Users\IR23544\AppData\Roaming\Mozilla\Firefox\Profiles\IR23544\CiteNPLTemp\CiteNPLWebPage.pdf.

Europe Patent Application No. 15823806.3, Communication Pursuant to Article 94(3) EPC (Examination Report), dated Mar. 26, 2018.

* cited by examiner

LAVATORY, FIRST CLASS, AND BUSINESS CLASS SEAT INTEGRATION

CROSS REFERENCE TO RELATED APPLICATIONS

This application is the U.S. national stage entry of International Application No. PCT/M2015/059859 ("the '859 application"), filed on Dec. 21, 2015, which application is related to and claims priority benefits from U.S. Provisional Application Ser. No. 62/094,804 ("the '804 application"), filed on Dec. 19, 2014, entitled LAVATORY, FIRST CLASS AND BUSINESS CLASS SEAT INTEGRATION. The '859 and '804 applications are hereby incorporated in their entireties by this reference.

FIELD OF THE INVENTION

The field of the invention relates to an arrangement of seat units for vehicle cabins.

BACKGROUND

Commercial aircraft, such as the Airbus A320 or Boeing 737 are typically constructed from modular components, the size, weight and construction of which are dictated by many considerations, including fuselage dimensions, aesthetic and safety considerations. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include lavatories for use by passengers and crew. Many aircraft cabin layouts also include different seat classes (e.g., business class, first class, economy class) installed therein. The classes are often separated from each other by monuments, dividers, etc. As illustrated in FIG. 1, this leads to the loss of space in between the different monuments, dividers and seats.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, an aircraft cabin arrangement comprises at least one lavatory unit comprising a first side wall, wherein the first side wall comprises a recessed portion, and at least one seat unit positioned adjacent the first side wall of the at least one lavatory unit. A separate wall is not positioned between the first side wall of the at least one lavatory unit and the at least one seat unit. The at least one seat unit comprises a foot support surface incorporated into the recessed portion of the first side wall.

In certain embodiments, the at least one seat unit is a first class seat unit or a business class seat unit. The aircraft cabin arrangement may further comprise a second seat unit of a different class than the at least one seat unit. In some embodiments, the at least one seat unit comprises a shell, the second seat unit is positioned adjacent the shell, and a separate wall is not positioned between the at least one seat unit and the second seat unit.

According to some embodiments, the shell comprises a vertical panel that extends upward to a greater height than a remainder of the at least one seat unit.

The arrangement may be 1-40 inches shorter in a longitudinal direction through elimination of the separate wall.

According to certain embodiments of the present invention, an aircraft cabin arrangement comprises at least one lavatory unit comprising a first side wall, and at least one seat unit positioned adjacent the first side wall of the at least one lavatory unit, wherein a separate wall is not positioned between the first side wall of the at least one lavatory unit and the at least one seat unit, and wherein the first side wall includes at least one amenity accessible by a passenger seated in the at least one seat unit.

In certain embodiments, at least one seat unit is a first class seat unit or a business class seat unit. The aircraft cabin arrangement may further comprise a second seat unit of a different class than the at least one seat unit. In some embodiments, the at least one seat unit comprises a shell, the second seat unit is positioned adjacent the shell, and a separate wall is not positioned between the at least one seat unit and the second seat unit.

According to some embodiments, the shell comprises a vertical panel that extends upward to a greater height than a remainder of the at least one seat unit.

The arrangement may be 1-40 inches shorter in a longitudinal direction through elimination of the separate wall.

In certain embodiments, the at least one amenity is a foot support surface, a monitor, sockets, stowage, and/or a tray table.

According to certain embodiments of the present invention, an aircraft cabin arrangement comprise at least one lavatory unit comprising a first side wall, at least two first class seat units, each first class seat unit comprising a shell, wherein one of the at least two first class seat units is positioned adjacent the first side wall of the at least one lavatory unit, and at least one non-first class seat unit positioned adjacent the shell of one of the at least two first class seat units, wherein a separate wall is not positioned between the first side wall of the at least one lavatory unit and the adjacent first class seat unit, and a separate wall is not positioned between the at least one non-first class seat unit and the shell of the adjacent first class seat unit.

According to some embodiments, the shell comprises a vertical panel that extends upward to a greater height than a remainder of the first class seat unit.

The arrangement may be 1-40 inches shorter in a longitudinal direction through elimination of the separate walls.

In certain embodiments, the first side wall includes at least one amenity accessible by a passenger seated in the adjacent first class seat unit. The at least one amenity may be a foot support surface.

In further embodiments, the shell includes at least one amenity accessible by a passenger seated in the adjacent non-first class seat unit. The at least one amenity may be a foot support surface, a monitor, sockets, stowage, and/or a tray table.

DETAILED DESCRIPTION

Figure 1:
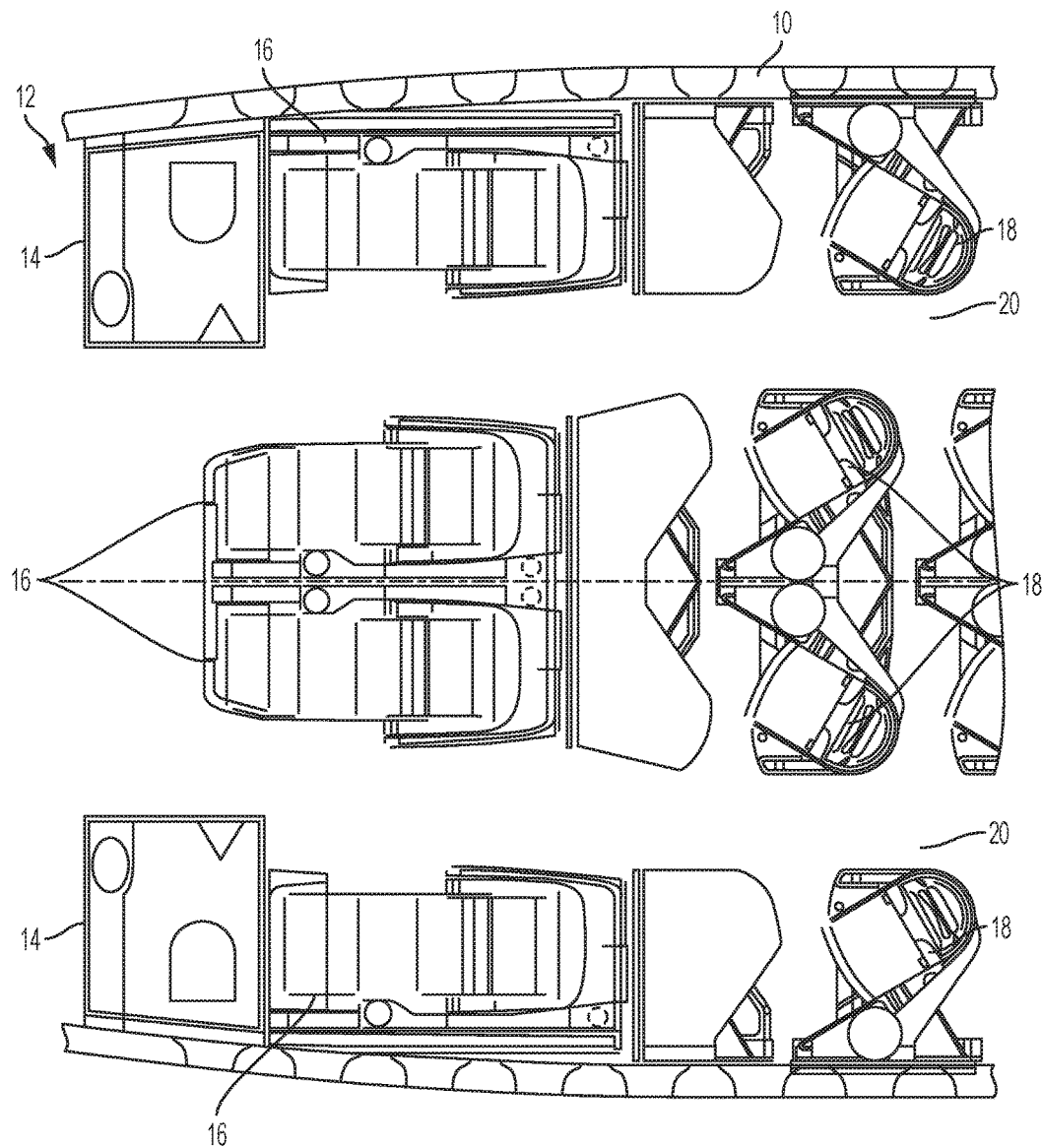
FIG. 1 is a top view of a cabin showing a conventional arrangement of a lavatory, first class seat units, and business class seat units.

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of seat units may be described with reference to an aircraft cabin, they are by no means so limited. In fact, the seat units may be used in conjunction with any type of vehicle cabin or otherwise as desired.

According to certain embodiments of the present invention, as illustrated in FIGS. 2-7, a cabin 10 comprises an aircraft cabin arrangement 12 formed by at least one lavatory unit 14, at least one first class seat unit 16, and at least one business class seat unit 18.

Figure 2:
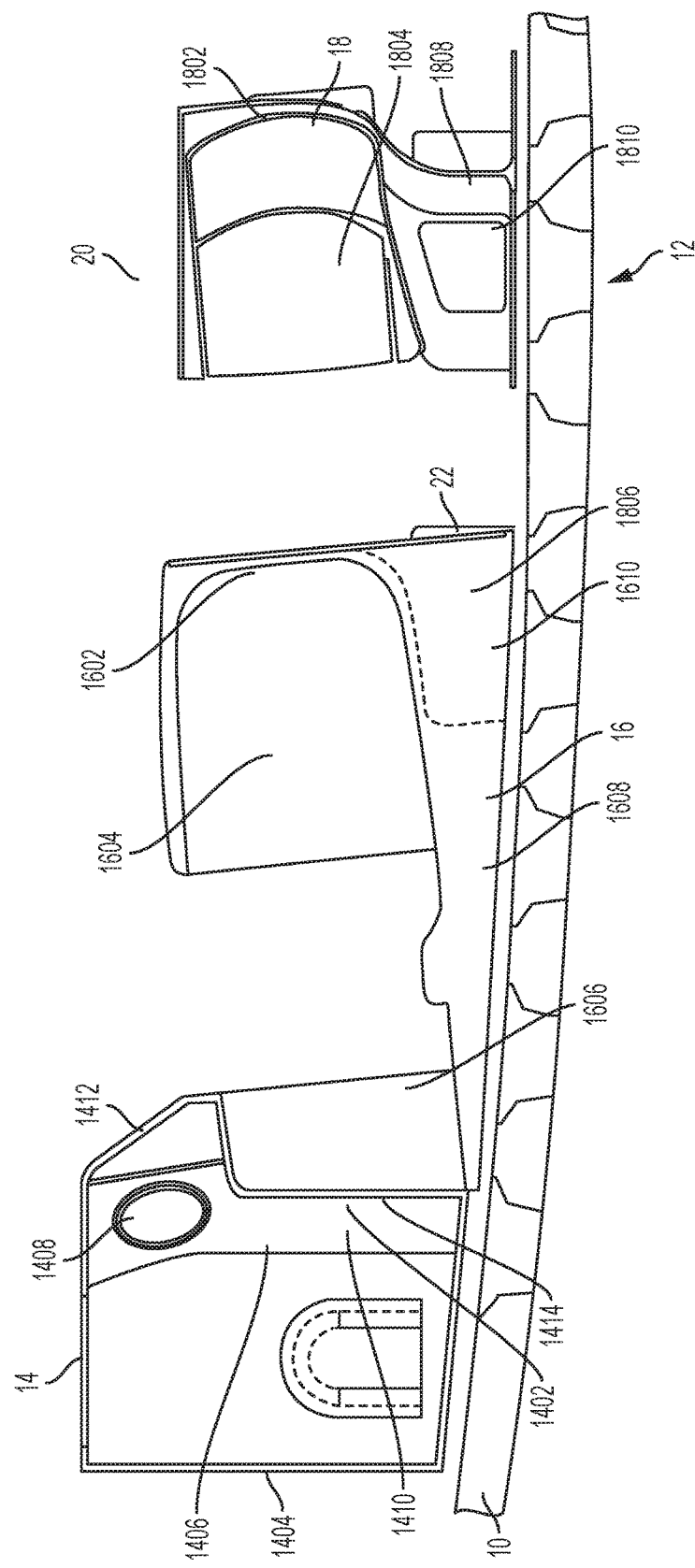
FIG. 2 is a top view of an aircraft cabin arrangement with a lavatory, a first class seat unit, and a business class seat unit, according to certain embodiments of the present invention.
Figure 3:
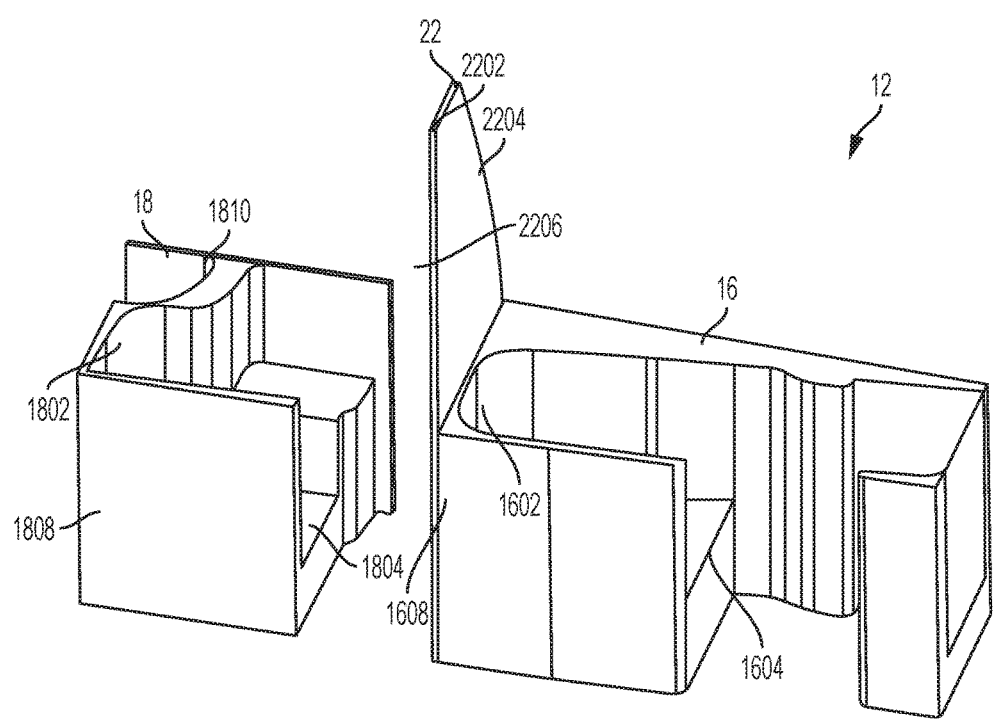
FIG. 3 is perspective view of the first class seat unit and the business class seat unit of FIG. 2.
Figure 4:
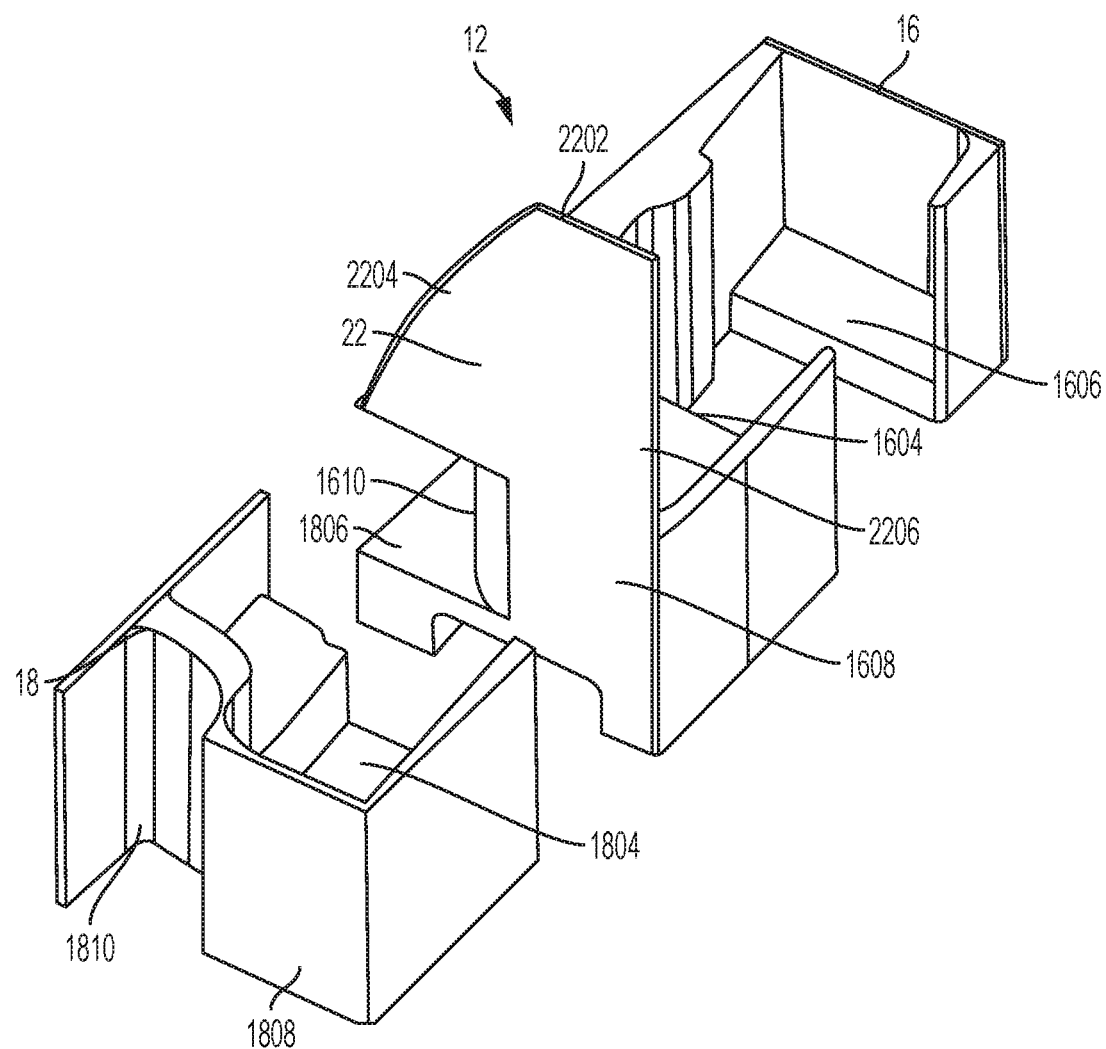
FIG. 4 is another perspective view of the first class seat unit and the business class seat unit of FIG. 2.
Figure 5:
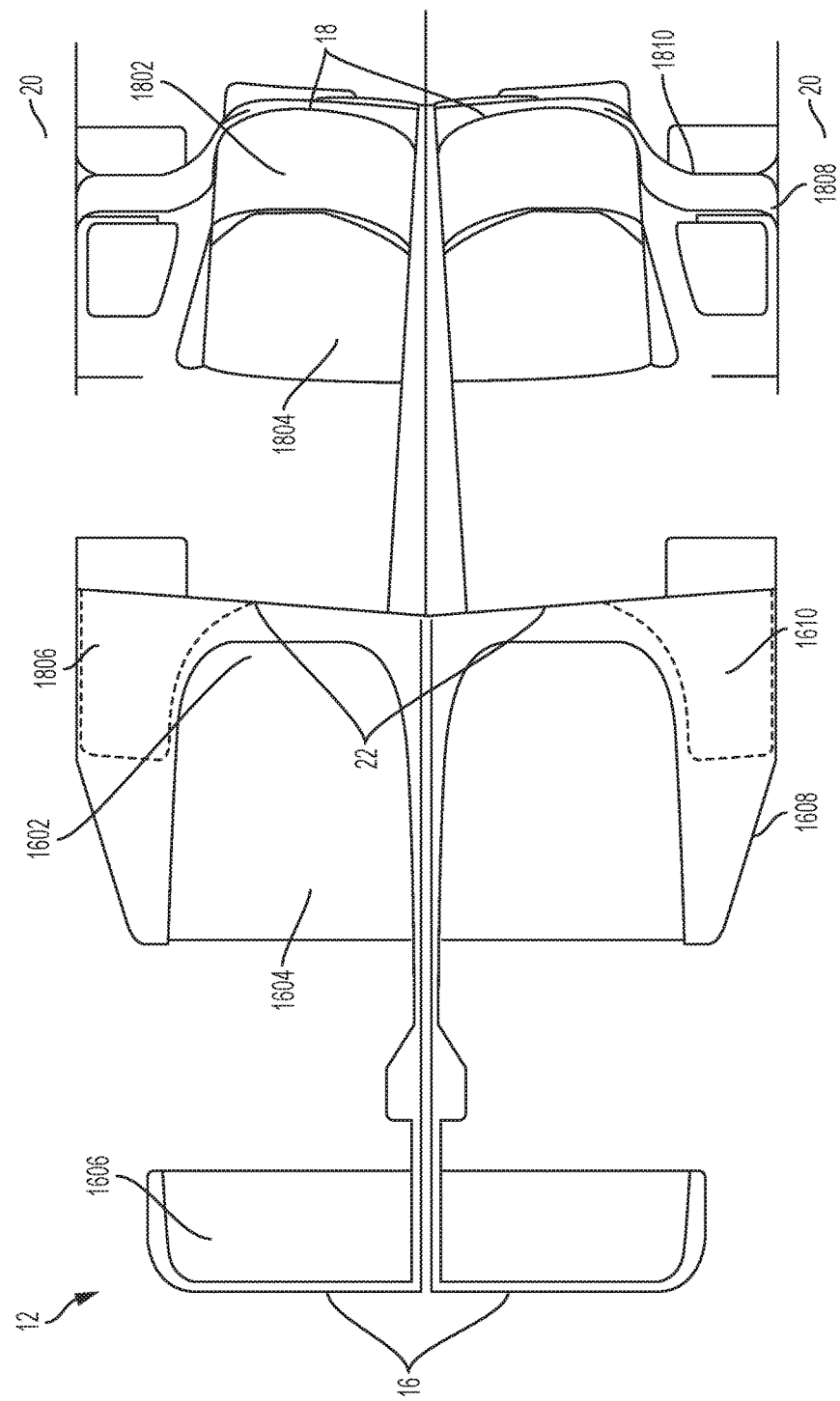
FIG. 5 is a top view of an aircraft cabin arrangement with a pair of first class seat units and a pair of business class seat units, according to certain embodiments of the present invention.
Figure 6:
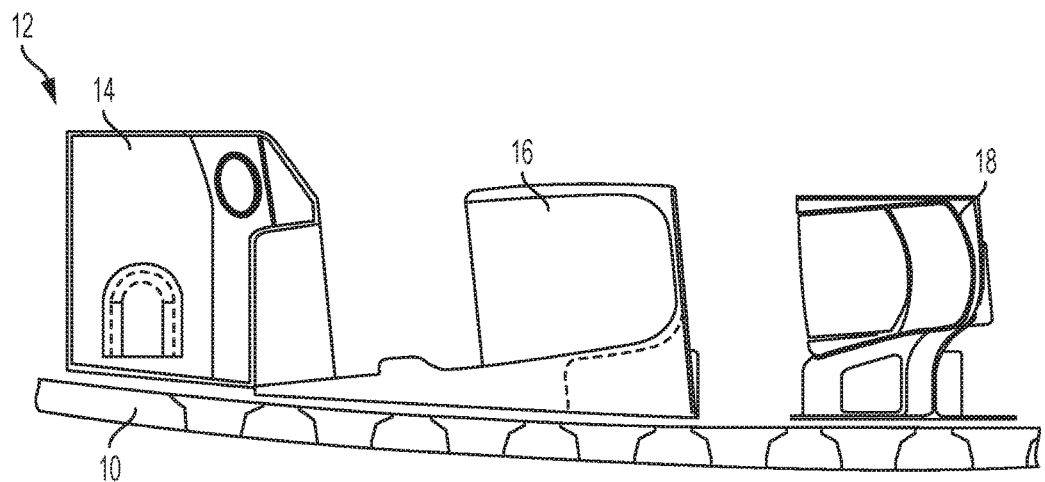
FIG. 6 is a top view of an aircraft cabin arrangement with a lavatory, a first class seat unit, and a business class seat unit, according to certain embodiments of the present invention.
Figure 7:
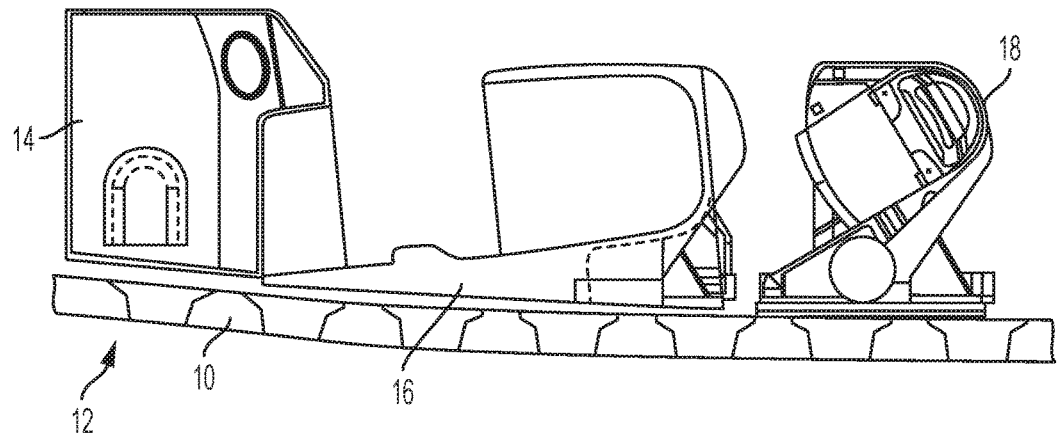
FIG. 7 is a top view of an aircraft cabin arrangement with a lavatory, a first class seat unit, and a business class seat unit, according to certain embodiments of the present invention.

In these embodiments, the lavatory unit 14 comprises a first side wall 1402 and a second side wall 1404. In certain embodiments, the first side wall 1402 comprises a monument 1406, which includes a sink 1408 and a counter 1410. Thus, a person inside the lavatory unit 14 may make use of the area above the counter 1410 and sink 1408. The first side wall 1402 may have an irregular shape, as shown in FIGS. 2, 6-7, with a protruding portion 1412 and a recessed portion 1414. The protruding portion 1412 is shaped to contour the portion of the monument 1406 requiring greater depth for the sink 1408, and the recessed portion 1414 is shaped to contour the portion of the monument 1406 that requires less depth.

In some embodiments, the first class seat unit 16 comprises a seat back 1602, a seat pan 1604, and a secondary seat or foot rest 1606. The seat back 1602 and the seat pan 1604 are partially surrounded by a shell 1608. A recessed area 1610 may be located within the shell 1608 to one side of the seat back 1602 and the seat pan 1604. The shell 1608 may be configured to also at least partially surround the foot rest 1606.

In certain embodiments, as illustrated in FIG. 2, 6-7, the first class seat unit 16 may be positioned adjacent the first side wall 1402 of the lavatory unit 14. In this arrangement, the foot rest 1606 may be positioned within and coupled to the recessed portion 1414 of the first side wall 1402 of the lavatory unit 14. The shell 1608 may also couple to an end of the recessed portion 1414 of the first side wall 1402 to provide continuity to the enclosure for to the first class seat unit 16.

As a result, the recessed portion 1414 of the lavatory unit 14 is fully utilized for the foot rest 1606 and a separate wall between the lavatory unit 14 and the first class seat unit 16 is eliminated. In certain embodiments, the first side wall 1402 may further include some or all of the foot rest 1606, a monitor, sockets, stowage, and/or any other first class amenity typically provided within the front wall of a first class seat unit 16.

The business class seat unit 18 comprises a seat back 1802, a seat pan 1804, and a foot well 1806. The seat back 1802 and the seat pan 1804 are partially surrounded by a shell 1808. A recessed area 1810 may be located within the shell 1808 to one side of the seat back 1802 and the seat pan 1804.

In certain embodiments, as illustrated in FIGS. 2-7, the business class seat unit 18 may be positioned adjacent the shell 1608 of the first class seat unit 16. In this arrangement, the foot well 1806 may be positioned within and coupled to the recessed area 1610 in the shell 1608 of the first class seat unit 16. As a result, the recessed area 1610 is fully utilized for the foot well 1806 and a separate wall between the first class seat unit 16 and the business class seat unit 18 is eliminated.

In other words, the shell 1608 of the first class seat unit 16 has taken on the function of a business class seat unit 18 front row monument. In certain embodiments, the shell 1608 may further include some or all of the foot well 1806, a monitor, sockets, stowage, and/or any other business class amenity typically provided within a front row monument of a business class seat unit 18.

In further embodiments, an economy class seat unit (not shown) may be positioned adjacent the shell 1808 of the business class seat unit 18 or adjacent the shell 1608 of the first class seat unit 16. As a result, a separate wall between the economy class seat unit and either the business class seat unit 18 or the first class seat unit 16 is eliminated.

In this arrangement, the shell 1808 of the business class seat unit 18 or the shell of the first class seat unit 16 may function as an economy class seat unit front row monument. In certain embodiments, the shell 1808 or the shell 1608 may further include some or all of a monitor, sockets, stowage, tray table, and/or any other economy class amenity typically provided within a front row monument of an economy seat unit.

In further embodiments, the business class seat unit 18 may be positioned adjacent the first side wall 1402 of the lavatory unit 14. In this arrangement, the foot well 1806 may be positioned within and coupled to the recessed portion 1414 of the first side wall 1402 of the lavatory unit 14. As a result, the recessed portion 1414 of the lavatory unit 14 is fully utilized for the foot well 1806 and a separate wall between the lavatory unit 14 and the business class seat unit 18 is eliminated. As a result, the first side wall 1402 may further include some or all of the foot well 1806, a monitor, sockets, stowage, and/or any other business class amenity typically provided within a front row monument of a business class seat unit 18.

In further embodiments, an economy class seat unit (not shown) may be positioned adjacent the first side wall 1402 of the lavatory unit 14. As a result, a separate wall between the lavatory unit 14 and the economy class seat unit is eliminated. In this arrangement, the first side wall 1402 of the lavatory unit 14 may function as an economy class seat unit front row monument. As a result, the first side wall 1402 may further include some or all of a monitor, sockets, stowage, tray table, and/or any other economy class amenity typically provided within a front row monument of an economy seat unit.

In the embodiments where the shell of one seat unit is used to also function as a divider between two classes of seat units, the shell may be modified to include a vertical panel 22. The vertical panel 22 is shaped to extend upward toward the ceiling of the cabin to a greater height than the remainder of seat unit. In some embodiments, an upper surface 2202 and at least one side surface 2204 of the vertical panel 22 may be shaped to contour to the surface of the cabin. The vertical panel 22 may further include a substantially straight surface 2206, which may border an aisle 20. Thus, from the perspective of a passenger seated in the seat unit located behind the shell, the vertical panel 22 provides the appearance of a separate divider wall positioned between the classes.

Any suitable arrangement of seat units may be used with the arrangement 12. For example, the seat units 16, 18 may be angled, staggered, forward facing, aft facing, or any combination thereof. Furthermore, arrangement 12 may be used with both central seats (seats positioned between aisles) and lateral seats (seats positioned between an aisle and a wall of the cabin), as well as seats facing longitudinally or traversely.

By eliminating the monuments, dividers, etc. between classes in the cabin, the arrangement 12 gains additional longitudinal space within the cabin 10 in the range of about 1 inch to about 40 inches, further in the range of 15 inches to about 25 inches, and even further in the range of about 20 inches.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. An aircraft cabin arrangement comprising:
   at least one lavatory unit comprising an outer end, an inner end, and a first side wall extending from the outer end to the inner end, wherein the first side wall comprises a protruding portion and a recessed portion between the outer end and the inner end, wherein the first side wall further comprises a monument; and
   at least one seat unit positioned adjacent the first side wall of the at least one lavatory unit;
   wherein the first side wall of the at least one lavatory unit forms a portion of a shell at least partially surrounding the at least one seat unit,
   wherein the monument extends along the first side wall from the outer end to the inner end, wherein the monument comprises a counter, the counter comprising a first portion and a second portion, the second portion comprising a sink,
   wherein a depth of the first portion of the counter is less than the depth of the second portion of the counter comprising the sink,
   wherein the first portion is provided along the recessed portion of the first wall, and wherein the second portion of the counter comprising the sink is provided along the protruding portion of the first wall,
   wherein the at least one seat unit comprises a primary seat having a seat pan and a foot support surface located opposite the primary seat, and wherein the foot support surface is a foot rest that is positioned within and coupled to the recessed portion of the first side wall.

2. The aircraft cabin arrangement of claim 1, further comprising a second seat unit having a smaller footprint than the at least one seat unit.

3. The aircraft cabin arrangement of claim 2, wherein the second seat unit is positioned adjacent a second portion of the shell.

4. The aircraft cabin arrangement of claim 3, wherein the shell comprises a vertical panel that extends upward to a greater height than a remainder of the at least one seat unit.

5. The aircraft cabin arrangement of claim 1, wherein the arrangement is 1-40 inches shorter in a longitudinal direction than an aircraft cabin arrangement having the same configuration but without the first side wall of the at least one lavatory unit forming a portion of the shell at least partially surrounding the at least one seat unit.

6. An aircraft cabin arrangement comprising:
   at least one lavatory unit comprising a first side wall, wherein the first side wall comprises a protruding portion and a recessed portion, wherein the first side wall further comprises a monument extending along a length of the first side wall and such that the monument extends along both the protruding portion and the recessed portion; and
   at least one seat unit positioned adjacent the first side wall of the at least one lavatory unit,
   wherein the first side wall of the at least one lavatory unit forms a portion of a shell at least partially surrounding the at least one seat unit,
   wherein the monument comprises a counter with a first portion and a second portion, wherein the first portion comprises a sink, and wherein a depth of the first portion is greater than the depth of the second portion, wherein the protruding portion of the first wall is provided along the first portion and wherein the recessed portion of the first wall is provided along the second portion,
   wherein the at least one seat unit comprises a primary seat having a seat pan and a foot support surface located opposite the primary seat, and wherein the foot support surface is a foot rest that is positioned within and coupled to the recessed portion of the first side wall.

7. The aircraft cabin arrangement of claim 6, further comprising a second seat unit having a smaller footprint than the at least one seat unit.

8. The aircraft cabin arrangement of claim 7, wherein the second seat unit is positioned adjacent a second portion of the shell.

9. The aircraft cabin arrangement of claim 8, wherein the shell comprises a vertical panel that extends upward to a greater height than a remainder of the at least one seat unit.

10. The aircraft cabin arrangement of claim 6, wherein the arrangement is 1-40 inches shorter in a longitudinal direction than an aircraft cabin arrangement having the same configuration but without the first side wall of the at least one lavatory unit forming a portion of the shell at least partially surrounding the at least one seat unit.

11. The aircraft cabin arrangement of claim 6, wherein the at least one amenity is at least one of a monitor, sockets, stowage, or a tray table.

12. An aircraft cabin arrangement comprising:
at least one lavatory unit comprising a first side wall, wherein the first side wall comprises a protruding portion and a recessed portion, wherein the first side wall further comprises a monument extending along the protruding portion and the recessed portion;
at least two first seat units, each first seat unit at least partially surrounded by a shell, wherein one of the at least two first seat units is positioned adjacent the first side wall of the at least one lavatory unit; and
at least one second seat unit positioned adjacent the shell of one of the at least two first seat units,
wherein the first side wall of the at least one lavatory unit forms a portion of the shell at least partially surrounding the adjacent first seat unit, foot support surface located opposite the primary seat,
wherein the monument comprises a counter extending along the protruding portion and the recessed portion of the first wall and a sink in a portion of the counter adjacent to the protruding portion, and wherein a depth of the portion of the counter with the sink is a greatest depth of the monument.

13. The aircraft cabin arrangement of claim 12, wherein each shell comprises a vertical panel that extends upward to a greater height than a remainder of each of the first seat units.

14. The aircraft cabin arrangement of claim 12, wherein the arrangement is 1-40 inches shorter in a longitudinal direction than an aircraft cabin arrangement having the same configuration but without the first side wall of the at least one lavatory unit forming a portion of the shell at least partially surrounding the adjacent first seat unit.

15. The aircraft cabin arrangement of claim 12, wherein the first side wall includes at least one amenity accessible by a passenger seated in the adjacent first seat unit.

16. The aircraft cabin arrangement of claim 15, wherein the at least one amenity is at least one of a monitor, sockets, stowage, or a tray table.

17. The aircraft cabin arrangement of claim 12, wherein each shell includes at least one amenity accessible by a passenger seated in the adjacent second seat unit.

18. The aircraft cabin arrangement of claim 17, wherein the at least one amenity is at least one of a monitor, sockets, stowage, or a tray table.

* * * * *